United States Patent
Agrawal et al.

(10) Patent No.: US 11,758,461 B2
(45) Date of Patent: *Sep. 12, 2023

(54) FLEXIBLE DISTRIBUTED ANTENNA ARRAY

(71) Applicant: MAXLINEAR, INC., Carlsbad, CA (US)

(72) Inventors: Abhishek Kumar Agrawal, Fremont, CA (US); Huizhao Wang, San Jose, CA (US); Peiman Amini, Fremont, CA (US); Sigurd Schelstraete, Menlo Park, CA (US); Debashis Dash, Newark, CA (US)

(73) Assignee: MaxLinear, Inc., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/664,273

(22) Filed: May 20, 2022

(65) Prior Publication Data

US 2022/0279418 A1    Sep. 1, 2022

Related U.S. Application Data

(63) Continuation of application No. 17/176,547, filed on Feb. 16, 2021, now Pat. No. 11,368,896.

(Continued)

(51) Int. Cl.
*H04L 1/02* (2006.01)
*H04W 40/12* (2009.01)
(Continued)

(52) U.S. Cl.
CPC .......... *H04W 40/12* (2013.01); *H04B 7/0452* (2013.01); *H04L 1/0061* (2013.01); *H04L 1/18* (2013.01); *H04L 5/0005* (2013.01); *H04L 5/0041* (2013.01); *H04L 5/0044* (2013.01); *H04L 5/0053* (2013.01); *H04L 47/34* (2013.01); *H04W 28/06* (2013.01); *H04W 72/542* (2023.01); *H04W 74/0816* (2013.01); *H04W 88/085* (2013.01); *H04W 72/0453* (2013.01); *H04W 72/0473* (2013.01)

(58) Field of Classification Search
CPC ..... H04L 1/0618; H04L 1/06; H04L 27/2647; H04L 5/0007; H04W 48/20; H04W 4/80; H04W 92/12; H04B 7/017
USPC ......................................... 375/267, 260, 262
See application file for complete search history.

(56) References Cited

U.S. PATENT DOCUMENTS 11,018,917 B1    5/2021  Shattil
11,184,037 B1 *  11/2021 Shattil .................. H04B 1/0003
(Continued)

*Primary Examiner* — Khai Tran
(74) *Attorney, Agent, or Firm* — Buchalter; Jason W. Croft

(57) ABSTRACT

A communication system includes multiple distributed antenna circuits and an access point (AP). The distributed antenna circuits include at least first and second antenna circuits. The AP is coupled to the distributed antenna circuits and includes multiple transmit chains, multiple receive chains, and an antenna control circuit communicatively coupled to the transmit chains and the receive chains. The first antenna circuit is co-located with the AP and the second antenna circuit is remote from the AP. The antenna control circuit is configured to determine a subset of the distributed antenna circuits to communicatively couple to at least some of the transmit chains to transmit data to a wireless station (STA) that is in range of the subset.

20 Claims, 8 Drawing Sheets

Related U.S. Application Data

(60) Provisional application No. 63/019,220, filed on May 1, 2020.

(51) Int. Cl.
| | |
|---|---|
| *H04W 74/08* | (2009.01) |
| *H04L 1/00* | (2006.01) |
| *H04L 5/00* | (2006.01) |
| *H04B 7/0452* | (2017.01) |
| *H04W 88/08* | (2009.01) |
| *H04L 1/18* | (2023.01) |
| *H04L 47/34* | (2022.01) |
| *H04W 28/06* | (2009.01) |
| *H04W 72/542* | (2023.01) |
| *H04W 72/0453* | (2023.01) |
| *H04W 72/044* | (2023.01) |

(56) References Cited

U.S. PATENT DOCUMENTS

| | | | |
|---|---|---|---|
| 2013/0295980 A1* | 11/2013 | Reuven | H04B 17/345 |
| | | | 455/226.3 |
| 2016/0234792 A1 | 8/2016 | Zhuang et al. | |
| 2020/0091971 A1 | 3/2020 | Dehghan et al. | |
| 2020/0111351 A1* | 4/2020 | Vadlamani | H04W 4/46 |
| 2020/0145072 A1 | 5/2020 | Dash et al. | |
| 2021/0136700 A1 | 5/2021 | Arad et al. | |
| 2021/0282077 A1 | 9/2021 | Wei et al. | |

* cited by examiner

FLEXIBLE DISTRIBUTED ANTENNA ARRAY

CROSS-REFERENCE TO RELATED APPLICATION

This patent application is a continuation of U.S. application Ser. No. 17/176,547 filed on Feb. 16, 2021 which claims the benefit of and priority to U.S. Provisional App. No. 63/019,220 filed May 1, 2020 titled "WIRELESS DATA TRANSMISSION". The Ser. No. 17/176,547 application and the 63/019,220 application is each incorporated herein by reference in its entirety.

FIELD

The implementations discussed herein relate to a flexible distributed antenna array.

BACKGROUND

Unless otherwise indicated in the present disclosure, the materials described in the present disclosure are not prior art to the claims in the present application and are not admitted to be prior art by inclusion in this section.

Home, office, stadium, and outdoor networks, a.k.a. wireless local area networks (WLAN) are established using a device called an Access Point (AP). The AP may include a router. The AP wirelessly couples all the devices of the local network, e.g. wireless stations such as: computers, printers, televisions, digital video (DVD) players, security cameras and smoke detectors to one another and to the Cable or Subscriber Line through which Internet, video, and television is delivered to the local network. Most APs implement the IEEE 802.11 standard which is a contention-based standard for handling communications among multiple competing devices for a shared wireless communication medium on a selected one of various communication channels. The frequency range of each communication channel is specified in the corresponding one of the IEEE 802.11 protocols being implemented, e.g. "a", "b", "g", "n", "ac", "ad", "ax". Communications follow a hub and spoke model with a WAP at the hub and the spokes corresponding to the wireless links to each 'client' device or wireless station (STA).

The subject matter claimed in the present disclosure is not limited to implementations that solve any disadvantages or that operate only in environments such as those described above. Rather, this background is only provided to illustrate one example technology area where some implementations described in the present disclosure may be practiced.

SUMMARY

The implementations discussed herein relate to a flexible distributed antenna array.

In an implementation, a communication system includes multiple distributed antenna circuits and an AP coupled to the distributed antenna circuits. The distributed antenna circuits include first and second antenna circuits. The AP includes multiple transmit chains, multiple receive chains, and an antenna control circuit communicatively coupled to the transmit chains and the receive chains. The first antenna circuit is co-located with the AP and the second antenna circuit is remote from the AP. The antenna control circuit is configured to determine a subset of the distributed antenna circuits to communicatively couple to at least some of the transmit chains to transmit data to a STA that is in range of the subset of the distributed antenna circuits.

In another implementation, a method to communicate using multiple distributed antenna circuits in a communication system includes determining a subset of the distributed antenna circuits to communicatively couple to at least some of multiple transmit chains of an AP to transmit data from the AP to a STA that is in range of the subset of the distributed antenna circuits. Determining the subset of the distributed antenna circuits includes determining that the STA is in range of a given antenna circuit of the subset, the given antenna circuit being remote from the AP. The method includes communicatively coupling the subset of the distributed antenna circuits, including the given antenna circuit, to the at least some of the transmit chains. The method includes directing the data from the at least some of the transmit chains to the subset of the distributed antenna circuits, including the given antenna circuit.

BRIEF DESCRIPTION OF THE DRAWINGS

Example implementations will be described and explained with additional specificity and detail through the use of the accompanying drawings in which.

DETAILED DESCRIPTION

Figure 1A:
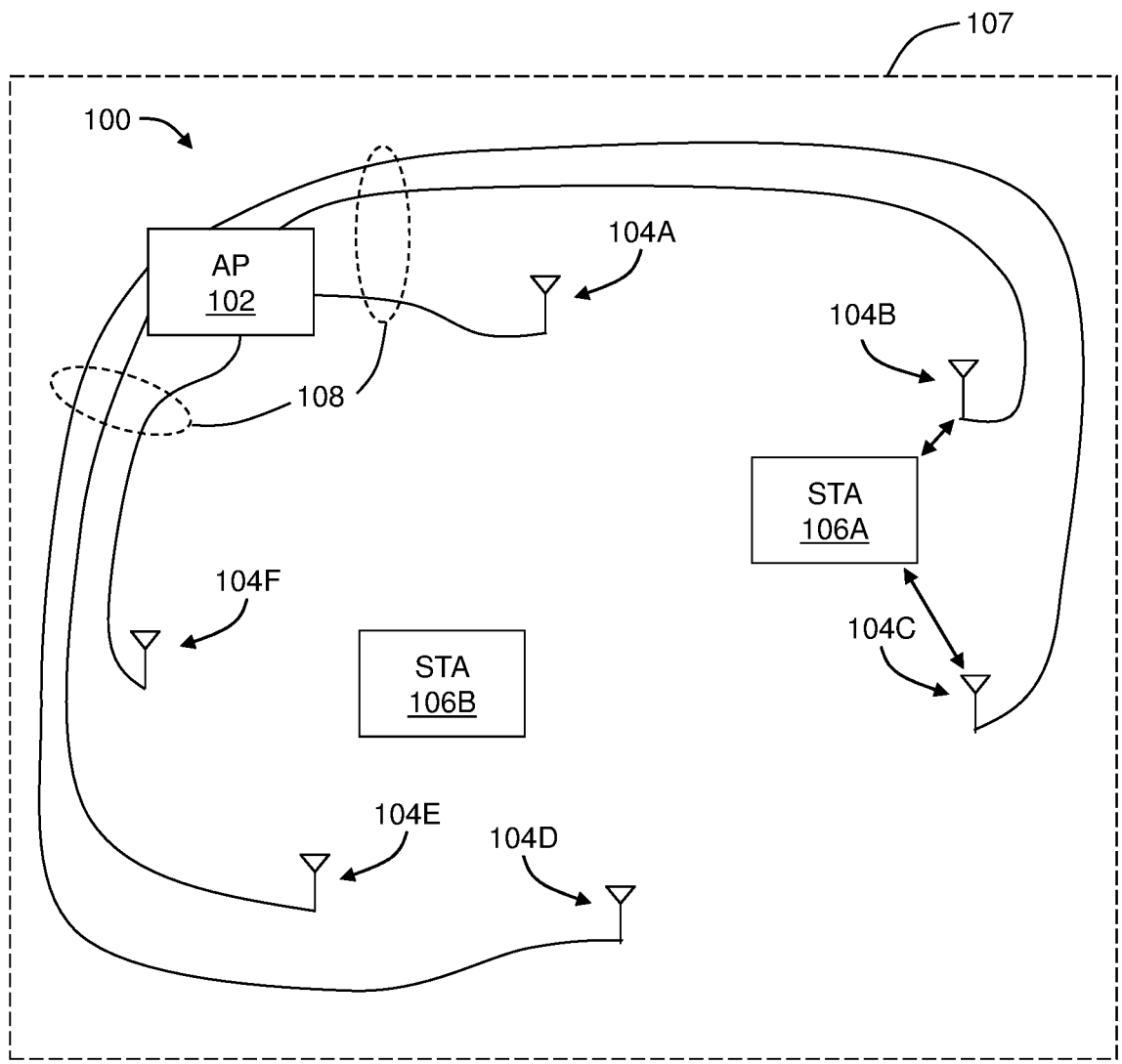
FIGS. 1A-1C illustrate an example communication system that includes an AP and multiple distributed antenna circuits.

APs have limited range and a single AP may be unable to cover an entire house, enterprise, or other premises. For example, if the AP is located in an office or other room in one corner or side of a premises, the AP's range may not extend all the way to an opposite corner or side of the premises. As a result, STAs may be unable to connect to the AP from the opposite corner or side of the premise or may have an intermittent connection when at or near the limits of the AP's range.

Placing the AP at or near the center of the premises may provide the desired WLAN coverage for the premises. However, it may not always be convenient or even possible to place the AP at such a central location within the premises. In some cases, the premises may be so large that the AP's range may be insufficient to cover the entire premises even when placed at the central location within the premises.

Alternatively, multiple APs may be deployed in the house or enterprise in a multi-AP or mesh AP arrangement. In such networks, multiple APs synchronize their transmission to one or more STAs to effectively act as a single AP as perceived by the STAs or one or more of the APs may act as a relay with data making one or more hops before reaching the STA. The APs may effectively behave as a larger antenna array which can result in enhanced beamforming (BF) gain and enhanced multi-user (MU)-multiple-input and multiple-output (MIMO) gain.

However, multi-AP networks require a backhaul in which one of the APs acts as a master AP to first communicate data to the other APs, or slave APs, before the data is actually transmitted to the STAs. In addition, independent APs need tight synchronization on transmission to STAs and a sample clock in multi-AP networks. They may also require enhanced channel measurement and exchange among the APs.

Implementations described herein may extend the coverage of a single AP, e.g., in a home or enterprise, by coupling the AP to a pool or array of antennas. The antennas may be spatially distributed throughout a premises (e.g., home or enterprise) and may be referred to as distributed antennas, or more generally as distributed antenna circuits, each of which includes at least an antenna. One or more of the antenna circuits may be co-located with the AP and/or one or more of the antenna circuits may be remote from the AP. In some implementations, each antenna circuit includes other components co-located with the antenna, such as power amplifiers or radio frequency (RF) components. The antennas may radiate signals received from the AP without performing any WiFi processing on the signals. Such an arrangement may avoid the backhaul and synchronization problems of multi-AP networks while still achieving enhanced BF gain and enhanced MU-MIMO gain.

These and other implementations of the present disclosure will be explained with reference to the accompanying figures. It is to be understood that the figures are diagrammatic and schematic representations of such example implementations, and are not limiting, nor are they necessarily drawn to scale. In the figures, features with like numbers indicate like structure and function unless described otherwise.

Figure 1B:
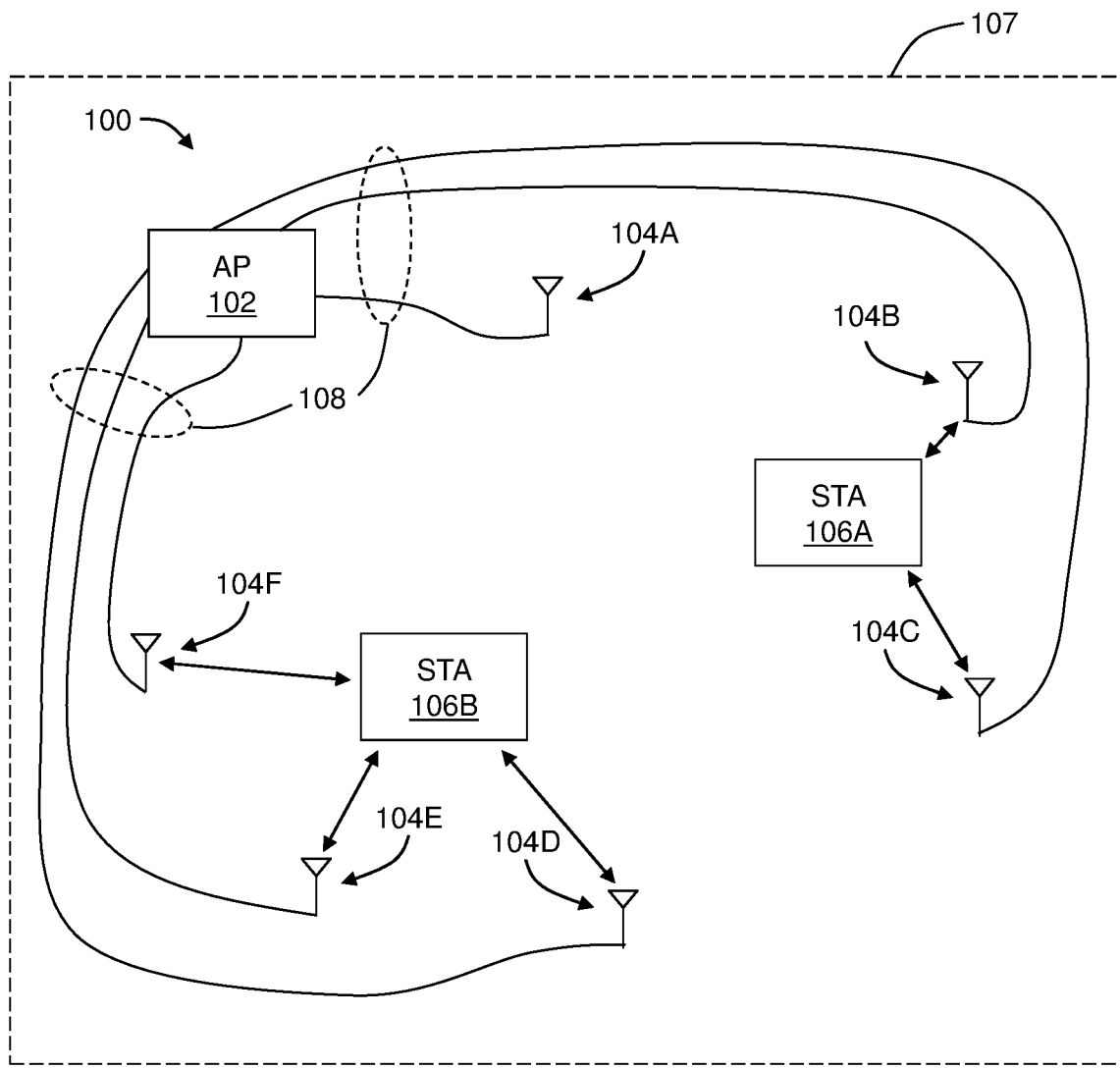
Figure 1C:
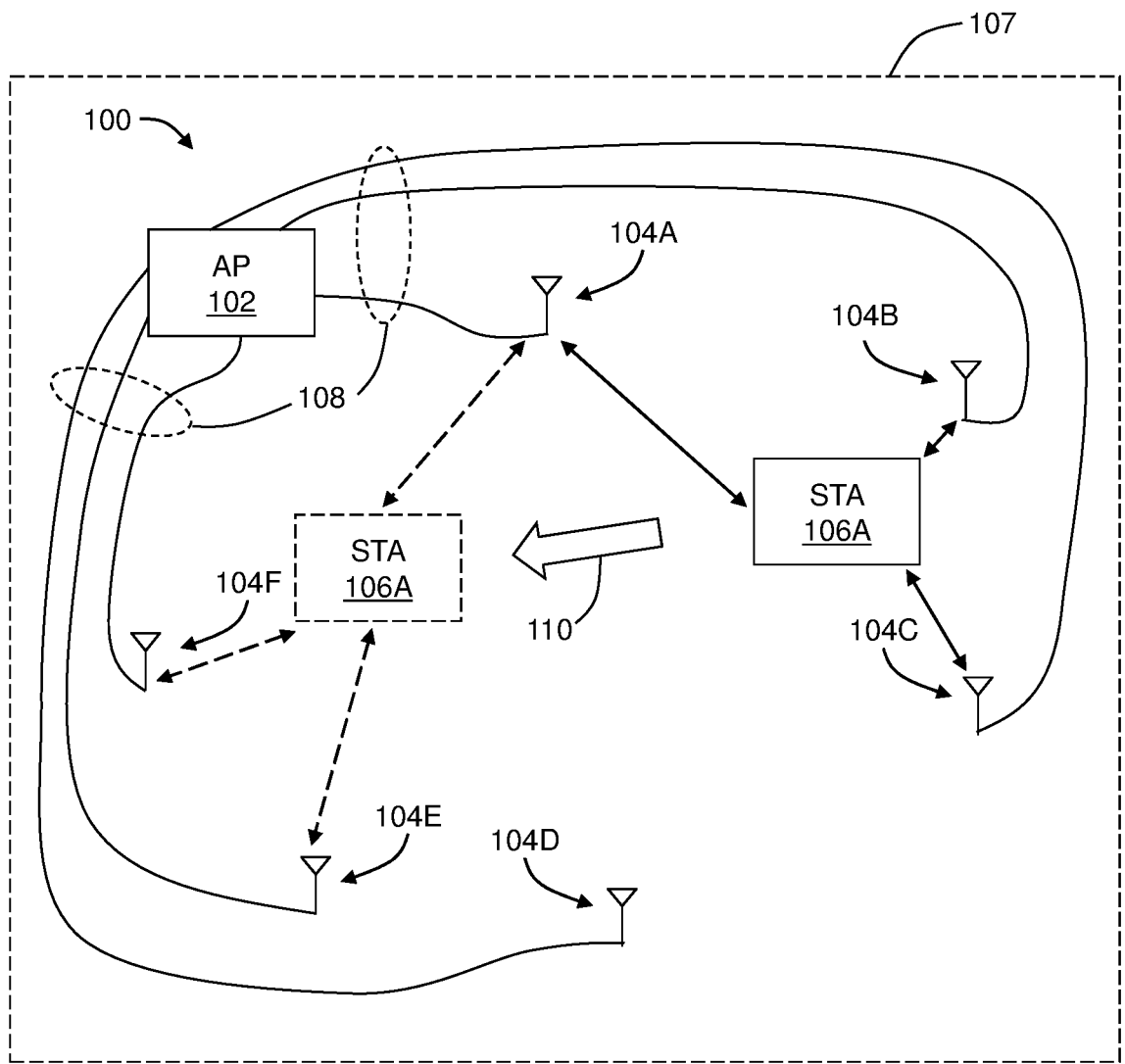

FIGS. 1A-1C illustrate an example communication system 100 that includes an AP 102 and multiple distributed antenna circuits 104A-104F (hereinafter collectively "antenna circuits 104"), arranged in accordance with at least one implementation described herein. The communication system 100 may wirelessly communicate with one or more STAs, such as a first STA 106A and/or a second STA 106B (hereinafter collectively "STAs 106"). In general, the AP 102 and the STAs 106 may be configured to wirelessly exchange data with each other, including sending and receiving data packets.

The AP 106 may include a gateway and/or other suitable access point for wireless stations or devices such as the STAs 106. The AP 102 may connect to the Internet and/or a core network via a bridge, a backhaul link, a base station, and/or other suitable devices or connections. In these and other implementations, the AP 106 includes multiple transmit and receive chains for the transmission and reception of data.

Each of the antenna circuits 104 includes an antenna. In some implementations, one or more of the antenna circuits 104 may consist essentially of an antenna. In some implementations, one or more of the antenna circuits 104 may additionally include a low noise amplifier (LNA) and/or RF circuitry. In some implementations, one or more of the antenna circuits 104 may include a radiohead, which may include an antenna, RF circuitry, an analog-to-digital converter (ADC), a digital-to-analog converter (DAC), an RF upconverter, and/or an RF downconverter. When a given one of the antenna circuits 104 is implemented as a radiohead, it may be communicatively coupled to the AP 106 by an optical fiber.

The antenna circuits 104 may be placed at various locations of a house, enterprise, or other premises 107 to provide a desired WLAN coverage for the premises. For example, one antenna circuit 104 may be located in or near a first room or set of rooms of a house, another antenna circuit 104 may be located in or near a second room or set of rooms of the house, and the remaining antenna circuits 104 may be similarly distributed throughout the house such that WLAN coverage is provided for the entire house.

Each of the STAs 106 may generally include any device that has the capability to wirelessly connect to the AP 102, through one or more of the antenna circuits 104, according to any of the IEEE 802.11 standards or other suitable wireless standard. Each of the STAs 106 may include a desktop computer, a laptop computer, a tablet computer, a mobile phone, a smartphone, a personal digital assistant (PDA), a smart television, or any other suitable wireless station.

The system 100 may additionally include communication lines 108 that couple the AP 102 to the antenna circuits 104. The communication lines 108 may be hardwired or wireless. For example, the communication lines 108 may include at least one of: coaxial cable, telephone cable, category 5 cable, category 5e cable, category 6 cable, optical fiber, or an air interface.

The system 100 may include more antenna circuits 104 than the AP 102 includes transmit chains or receive chains. In some implementations, a number of the antenna circuits 104 may significantly exceed a number of the transmit chains (or the receive chains) of the AP 102. For example, the AP 102 may include four transmit and receive chains or other number of transmit and receive chains and the antenna circuits 104 may include eight antenna circuits 104 or other number of antenna circuits 104. Accordingly, the AP 102 may include a switch fabric (not illustrated in FIGS. 1A-1C) to selectively communicatively couple its transmit chains (or receive chains) to the antenna circuits 104. In this and other implementations, the AP 102 may direct its transmit chain signals, or receive signals on its receive chains, through the switch fabric to or from a selected set of the antenna circuits 104.

The set of antenna circuits 104 selected for transmission or reception to or from the STAs 106 may depend on, e.g., a location of each STA 106. For example, those antenna circuits 104 that are within a predetermined range of the STA 106 or that have a predetermined channel quality with the STA 106 or that satisfy some other metric or threshold may be selected as the set of antenna circuits 104 for transmission or reception of data to or from the STA 106. In the example of FIG. 1A, the antenna circuits 104B, 104C may be selected for transmission or reception of data to or from the STA 106A.

Alternatively or additionally, different sets of antenna circuits 104 may be selected for different STAs in different locations of the premises. For instance, as illustrated in FIG. 1B, the antenna circuits 104B, 104C may be selected for transmission or reception of data to or from the STA 106A while the antenna circuits 104D, 104E, 104F may be selected for transmission or reception of data to or from the STA 106B.

In some implementations, the set of antenna circuits 104 for transmission or reception of data to or from the STA 106A may change over time, e.g., for a roaming STA. For instance, as illustrated in FIG. 1C, the antenna circuits 104A, 104B, 104C may be selected for transmission or reception of data to or from the STA 106A at a first time when the STA 106A is at a first location. After the STA 106A moves from the first location to a second location at a second time as indicated by an arrow 110, the antenna circuits 104A, 104E, 104F may be selected for transmission or reception of data to or from the STA 106A.

According to some implementations herein, the AP 102 may exploit the distributed nature of the antenna circuits 104 to implement BF and/or MU-MIMO in the communication system 100. For example, the AP 102 may implement BF on a downlink by controlling the phase and/or relative amplitude of the signal directed to each of two or more of the spatially distributed antenna circuits 104. In this manner, multiple instances of the signal radiate from the two or more antenna circuits 104 and constructively interfere at one or more locations (e.g., the location of an intended receiver STA 106) while destructively interfering at other locations. The AP 102 may alternatively or additionally implement BF on an uplink by a similar or analogous process.

The AP 102 may implement MU-MIMO to simultaneously transmit different data from the AP 102 to two or more STAs 106. For example, with reference to FIG. 1B, the AP 102 may direct signals intended for the STA 106A to a first set of the antenna circuits 104, such as the antenna circuits 104B, 104C, and signals intended for the STA 106B to a second set of the antenna circuits 104, such as the antenna circuits 104D, 104E, 104F. Each set of antenna circuits 104 may then radiate the signals received from the AP 102 to the corresponding STA 106.

Figure 2A:
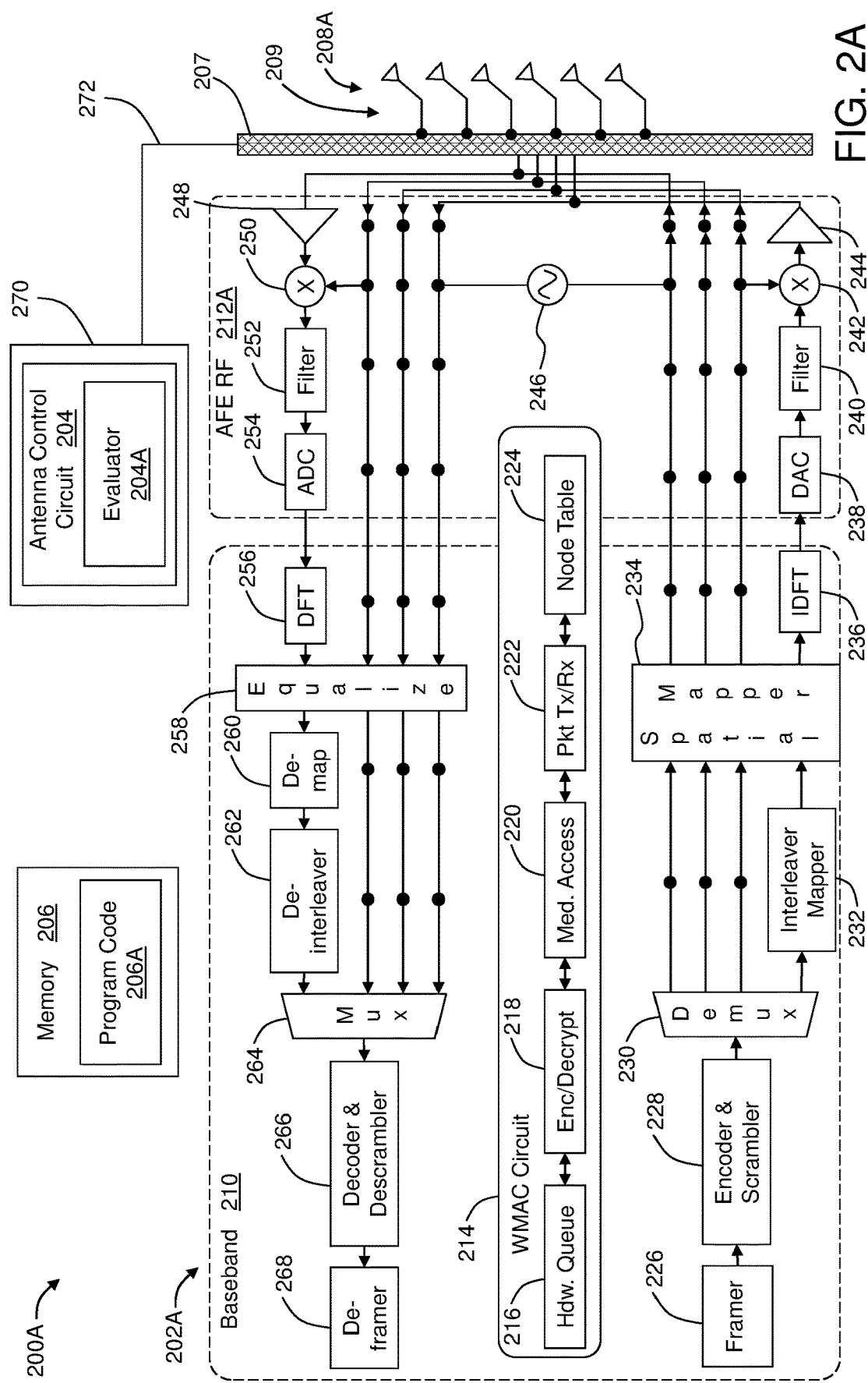
FIG. 2A is a block diagram of an example AP that may be implemented in the communication system of FIGS. 1A-1C.

FIG. 2A is a block diagram of an example AP 200A that may be implemented in the communication system 100 of FIGS. 1A-1C, arranged in accordance with at least one implementation described herein. The AP 200A may include, be included in, or correspond to the AP 102 of FIGS. 1A-1C. In general, the AP 200A may include a WiFi stage 202A, an antenna control circuit 204, and a non-volatile memory 206.

The WiFi stage 202A may generally include multiple shared and discrete components which make up various transmit and receive chains that are selectively communicatively couplable through a switch fabric 207 and communication lines 209 to multiple distributed antenna circuits 208A (hereinafter "antenna circuits 208A"). The antenna circuits 208A may include, be included in, or correspond to the antenna circuits 104 of FIGS. 1A-1C. In the example of FIG. 2A, the antenna circuits 208A each consists essentially of an antenna. The communication lines 209 may include, be included in, or correspond to the communication lines 108 of FIGS. 1A-1C.

The AP 200A is specifically illustrated in FIG. 2A as including four transmit chains and four receive chains, all coupled through the switch fabric 207 and the communication lines 209 to the antenna circuits 208A. Thus, the AP 200A may be a 4×4 MIMO AP that supports as many as 4 discrete communication streams over any four of the six antennas 208. More generally, the AP 200A may include two or more transmit chains and two or more receive chains (e.g., 2×2, 4×4, 5×5, . . . , 16×16, etc) and the antenna circuits 208A may include two or more antenna circuits 208A.

Although not illustrated in FIG. 2A, the AP 200A may couple via an integral modem to one of a cable, a fiber, or a digital subscriber backbone connection to, e.g., the Internet. A packet bus (not illustrated in FIG. 2A) may couple the modem to the WiFi stage 202A. The WiFi stage 202A supports wireless communications, e.g. IEEE 802.11 compliant communications, on a WLAN (not illustrated in FIG. 2A). As illustrated in FIG. 2A, the WiFi stage 202A includes a baseband circuit 210 and an analog front end (AFE) RF circuit 212A.

In the baseband circuit 210, wireless communications transmitted to or received from each STA are processed. The AFE RF circuit 212A handles the upconversion on each transmit chain or path of wireless transmissions initiated in the baseband circuit 210. The AFE RF circuit 212A also handles the downconversion of signals received on the receive chains or paths and passes them for further processing to the baseband circuit 210.

Each transmit chain/path may include one or more of the following discrete and shared components. Data to be transmitted on the packet bus is initially processed by a WiFi medium access control (WMAC) circuit 214. The WMAC circuit 214 includes hardware queues 216 for each downlink and uplink communication stream; an encryption and decryption circuit 218 to encrypt and decrypt the downlink and uplink communication streams; a medium access circuit 220 to make the clear channel assessment (CCA), and to make exponential random backoff and re-transmission decisions; and a packet processor circuit 222 for packet processing of the transmitted and received communication streams. The WMAC circuit 214 may have access to a node table 224 which lists each node/STA on the WLAN, the STA's capabilities, each corresponding encryption key, and/or a priority associated with its communication traffic.

Each sounding packet or data packet for wireless transmission on the transmit chain components to one or more STAs is framed in a framer 226. Next each stream is encoded and scrambled in an encoder and scrambler 228 followed by demultiplexing in a demultiplexer 230 into separate streams. Next, streams are subject to interleaving and mapping in a corresponding one of multiple interleaver mappers 232. A single interleaver mapper 232 is illustrated in FIG. 2A, with a series of three dots above the interleaver mapper 232 representing three replicate interleaver mappers 232 (e.g., for a total of four interleaver mappers 232 including one in each transmit chain in this example). Other components in FIG. 2A are similarly designated as having replicates by various series of dots.

Following interleaving and mapping, all transmissions are spatially mapped in a spatial mapper 234. The spatially mapped streams from the spatial mapper 234 are input to Inverse Discrete Fourier Transform (IDFT) circuits 236 for conversion from the frequency to the time domain and subsequent transmission in the AFE RF circuit 212A.

Each IDFT circuit 236 is coupled to a corresponding transmit chain/path in the AFE RF circuit 212A. Specifically, each IDFT circuit 236 couples to a corresponding DAC 238 to convert the digital transmission to analog, a corresponding filter 240, a corresponding RF upconverter 242, and a corresponding power amplifier 244. Each filter 240 may include a bandpass filter or other suitable filter. Each RF upconverter 242 is coupled to a common voltage-controlled oscillator (VCO) 246 to upconvert the transmission to an appropriate center frequency of a selected channel. Each power amplifier 244 may set a transmit power level of the transmission on the corresponding antenna of the corresponding antenna circuit 208 to which the corresponding transmit chain may be communicatively coupled at any given time. Outgoing signals or communications that reach the antennas of the antenna circuits 208A are radiated from the antennas, e.g., to STAs.

Each receive chain/path in the AFE RF circuit 212A may include one or more of the following discrete and shared components. Received communications on antennas of the antenna circuits 208A are subject to RF processing in the AFE RF circuit 212A including downconversion in the AFE RF circuit 212A. There are four receive paths in the illustrated implementation, each including one or more of the following discrete and shared components: an LNA 248 to amplify the received signal under control of an AGC (not illustrated in FIG. 2A) to set an amount by which the received signal is amplified, an RF downconverter 250 coupled to the VCO 246 to downconvert the received signal, a filter 252, e.g., to bandpass filter the received signal, and an ADC 254 to digitize the downconverted signal. The digital output from each ADC 254 is passed to a corresponding discrete Fourier transform (DFT) circuit 256 in the baseband circuit 210 of the WiFi stage 202A to convert from the time to the frequency domain.

Receive processing in the baseband circuit 210 may include one or more of the following shared and discrete components. First, an equalizer 258 is coupled to the output of the DFT 256 to mitigate channel impairments. The received WiFi streams at the output of the equalizer 258 are subject to demapping and deinterleaving in a corresponding demapper 260 and deinterleaver 262. Next, the received streams are multiplexed in multiplexer 264 and decoded and descrambled in a decoder and descrambler 266, followed by de-framing in a deframer 268. The received communication is then passed to the WMAC circuit 214 where it is decrypted with the encryption and decryption circuit 218 and placed in the appropriate upstream hardware queue 216 for upload to the Internet.

In an example implementation, the antenna control circuit 204 may be instantiated by a processor device 270 executing program code 206A stored on the non-volatile memory 206. The antenna control circuit 204 may generally be configured to control the AP 200A to perform one or more of the operations described herein.

The antenna control circuit 204 may include an evaluator 204A that evaluates system performance, channel quality, or other metric(s) and identifies and selects, based on the metric, one or more of the antenna circuits 208A to selectively communicatively couple to one or more corresponding transmit or receive chains for communications between the AP 200A and one or more STAs. The metric(s) or information from which the metric(s) may be derived by the evaluator 204A may include one or more of: measured signal strength on one or more antennas, background noise on one or more antennas, observed throughput of a data transmission employing a given subset of the antennas, packet error rate on one or more antennas, or other metric, or combination thereof.

For example, the evaluator 204A may evaluate signal strength of each antenna circuit 208A with the STA or of a subset of the antenna circuits 208A with the STA and the antenna control circuit 204 may select those antenna circuits 208A with a signal strength in excess of a threshold or within a range for communications with the STA. Alternatively, the antenna control circuit 204 may select a subset of the antenna circuits 208A that have a collective signal strength in excess of a threshold or within a range. In some implementations, the antenna control circuit 204 may select antenna circuits 208A that have an equal or substantially equal distribution of signal strengths, e.g., those antenna circuits 208A whose signal strength is within a range of values.

As another example, the evaluator 204A may evaluate throughput. In this example, the antenna control circuit 204 may at least initially use a default subset of antenna circuits 208A to communicate with the STA and may occasionally 204A sample, e.g., use, one or more different subsets of antenna circuits 208A to send one or more packets to the STA. After each sampling, the evaluator 204A may evaluate the throughput of each subset and the antenna control circuit 204 may then select for ongoing communications with the STA the subset of antenna circuits 208A that has a best (e.g., highest) throughput of all the subsets, a throughput that is better than that of at least one other subset, a throughput that is greater than or equal to a threshold throughput, or some other throughput.

As another example, the evaluator 204A may evaluate packet error rate. In this example, the antenna control circuit 204 may at least initially use a default subset of antenna circuits 208A to communicate with the STA and may occasionally 204A sample, e.g., use, one or more different subsets of antenna circuits 208A to send one or more packets to the STA. After each sampling, the evaluator 204A may evaluate the packet error rate of each subset and the antenna control circuit 204 may then select for ongoing communications with the STA the subset of antenna circuits 208A that has a best (e.g., lowest) packet error rate of all the subsets, a packet error rate that is better than that of at least one other subset, a packet error rate that is less than or equal to a threshold packet error rate, or some other packet error rate.

Samplings of subsets of antenna circuits 208A to, e.g., maximize throughput and/or minimize packet error rate, may occur periodically, randomly, pseudo-randomly, on-demand, or according to some other schedule or scheme. A length of time between samplings may be on the order of microseconds, seconds, tens of seconds, minutes, or other length of time depending on factors such as a mobility of each STA. For example, if the STA is a mobile device such as a smartphone, samplings may occur approximately once every second. As another example, if the STA is a static device such as a smart appliance, samplings may occur much less frequently than once every second.

Alternatively or additionally, the AP 200A may build a history over time of one or more STAs with which it communicates to identify those STAs that are always or typically static and/or those STAs that are always or typically mobile as well as a typical speed or range of speeds at which the mobile STAs move. In this and other examples, the length of time between samplings may be the greatest for static STAs, the lowest for fast mobile STAs, and somewhere in between for mobile STAs that are not as fast. In some examples, the speed of a mobile STA within a premises may be determined by the AP 200A in real-time or substantially in real-time and the AP 200A may adjust the length of time between samplings accordingly in real-time or substantially in real-time.

As another example, the evaluator 204A may evaluate signal strength of each antenna circuit 208A between transmission of packets to or reception of packets from the STA to determine the background noise at one or more of the antenna circuits 208A or of one or more subsets of antenna circuits 208A. The antenna control circuit 204 may select those antenna circuits 208A with a background noise that is lower than a threshold or within a range for communications with the STA, or may exclude from communications with the STA one or more antenna circuits 208A that have a background noise that is greater than a threshold or within a range. Alternatively, the antenna control circuit 204 may select a subset of the antenna circuits 208A that have a collective background noise that is less than a threshold or within a range or may exclude a subset of the antenna circuits 208A subset that have a collective background noise that is greater than a threshold or within a range.

The antenna control circuit 204 may provide a control signal 272 to the switch fabric 207 that causes the switch fabric 207 to selectively couple the transmit or receive chains of the AP 200A to corresponding antenna circuits 208 as selected by the antenna control circuit 204.

The switch fabric 207 may range in complexity from a simple multiplexer, e.g. 1×2, or 1×4, between each chain and corresponding ones of the antenna circuits 208A, to a complex switch fabric switchably coupling any chain to any of the antenna circuits 208A.

Figure 2B:
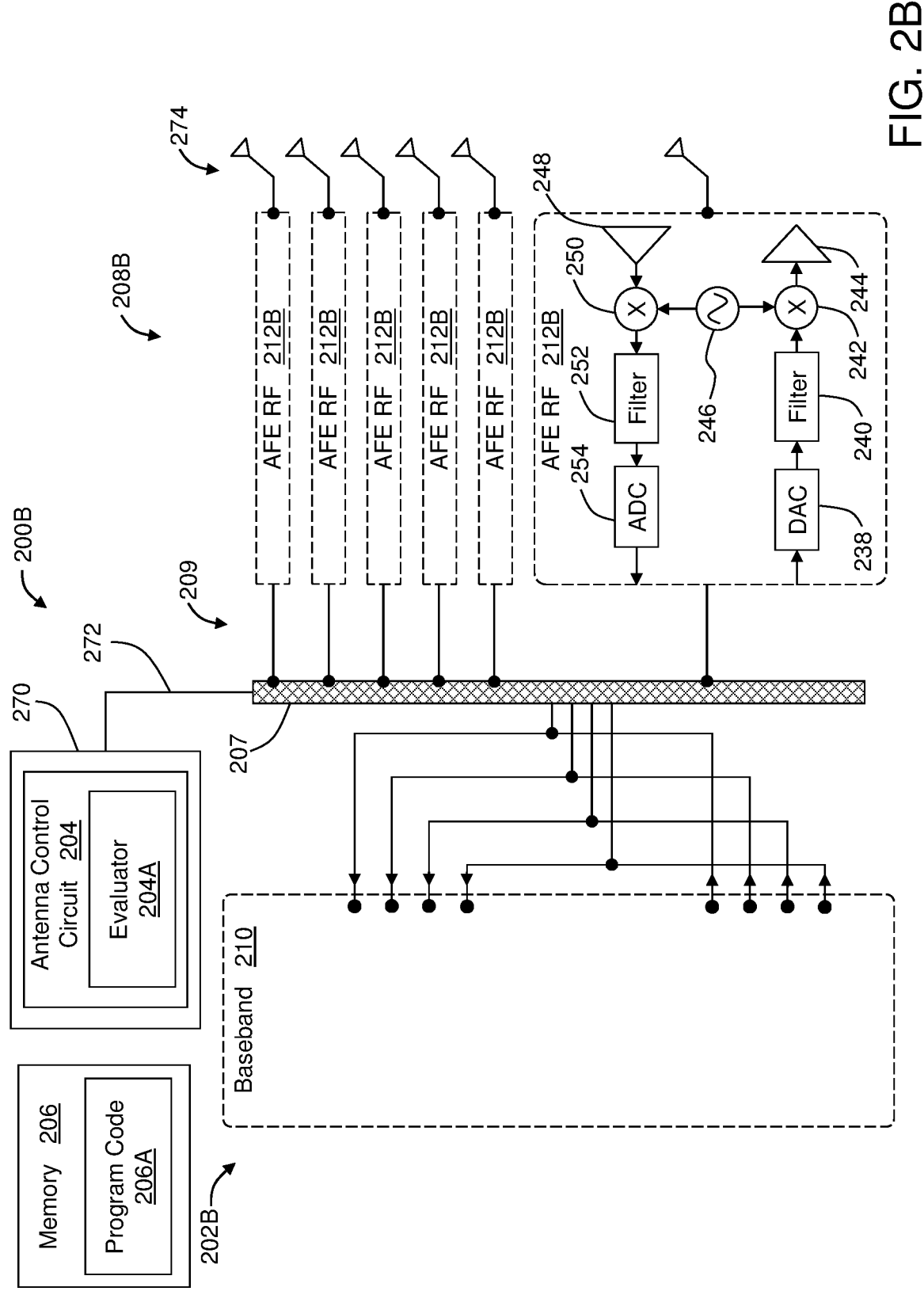
FIG. 2B is a block diagram of another example AP that may be implemented in the communication system of FIGS. 1A-1C.

FIG. 2B is a block diagram of another example AP 200B that may be implemented in the communication system 100 of FIGS. 1A-1C, arranged in accordance with at least one implementation described herein. The AP 200B may include, be included in, or correspond to the AP 102 of FIGS. 1A-1C. In general, the AP 200B may include a WiFi stage 202B, the antenna control circuit 204, and the non-volatile memory 206. The AP 200B may generally include the same or similar components and function in the same or similar manner with the same or similar connections as the AP 200A, except as otherwise noted herein.

For instance, the WiFi stage 202B of FIG. 2B includes the baseband circuit 210, similar to FIG. 2A. The baseband circuit 210 in FIG. 2B is shown without any of its components for simplicity. The baseband circuit 210 of FIG. 2B may include the same or similar components and may function in the same or similar manner as the baseband circuit 210 of FIG. 2A.

The WiFi stage 202B of FIG. 2B does not include the AFE RF circuit 212A. The functionality of the AFE RF circuit 212A of FIG. 2A is instead provided in each of multiple distributed antenna circuits 208B (hereinafter "antenna circuits 208B") to which the AP 200B is coupled through the switch fabric 207 and the communication lines 209. The antenna circuits 208B may include, be included in, or correspond to the antenna circuits 104 of FIGS. 1A-1C.

In the example of FIG. 2B, each of the antenna circuits 208B includes an antenna 274 and an AFE RF circuit 212B coupled together. Various components that may be included in each of the AFE RF circuits 212B are depicted in FIG. 2B for one of the AFE RF circuits 212B; the other AFE RF circuits 212B may include the same or similar components. As illustrated, each of the AFE RF circuits 212B includes one RF transmit chain and one RF receive chain, each of which has the same or similar components as each of the RF transmit and receive chains of the AFE RF circuit 212A of FIG. 2A.

In operation, the baseband circuit 210 of FIG. 2B processes wireless communications in the same or similar manner as in FIG. 2A. In the case of outbound communications, for example, the WMAC circuit 214 performs initial processing of data to be transmitted as described with respect to FIG. 2A. As further described with respect to FIG. 2A, the data may then be framed by the framer 226, encoded and scrambled by the encoder and scrambler 228, demultiplexed by the demultiplexer 230, interleaved and mapped by the interleaver mappers 232, spatially mapped by the spatial mapper 234, and then converted from the frequency to the time domain by the IDFT circuits 236 to be output from the baseband circuit 210 as digital signals. Each of these digital signals may be directed by and through the switch fabric 207 in accordance with the control signal 272 from the antenna control circuit 204 to a selectively coupled one of the antenna circuits 208B via a corresponding communication line 209.

Each of the selectively coupled antenna circuits 208B receives the digital signal output from the corresponding IDFT circuit 236 of the baseband circuit 210 at its AFE RF circuit 212B. The AFE RF circuit 212B converts the digital signal to an analog signal using the DAC 240, filters the signal using the filter 240, upconverts the signal using the RF upconverter 242, and amplifies the signal using the power amplifier 244 as described with respect to FIG. 2A. The filtered, upconverted, and amplified analog signal is then provided to the corresponding antenna 274, at which point the antenna 274 radiates a wireless signal from the analog signal.

Inbound communications are processed in much the same way as in FIG. 2A except that the RF functions occur in the AFE RF circuits 212B of the antenna circuits 208B rather than in the AFE RF circuit 212A of the AP 200A. In particular, when a given antenna 274 receives a wireless signal, it generates an analog signal therefrom, the analog signal being passed to the corresponding AFE RF circuit 212B. The AFE RF circuit 212B amplifies the signal using its LNA 248, downconverts the signal using its RF downconverter 250, filters the signal using its filter 252, and converts the analog signal to a digital signal using its ADC 254. These digital signals may be directed from the selectively coupled antenna circuits 208B and corresponding communication lines 209 by and through the switch fabric 207 in accordance with the control signal 272 from the antenna control circuit 204 to a corresponding receive chain of the baseband circuit 210.

In the baseband circuit 210 of FIG. 2B, the digital signals are converted from the time to the frequency domain by the DFT circuits 256, equalized by the equalizer 258, demapped and deinterleaved by the demappers 260 and deinterleavers 262, multiplexed by the multiplexer 264, decoded and descrambled by the decoder and descrambler 266, and de-framed in the deframer 268 as described with respect to FIG. 2A. As further described with respect to FIG. 2A, the received communication may then be passed to the WMAC circuit 214 where it is decrypted with the encryption and decryption circuit 218 and placed in the appropriate upstream hardware queue 216 for upload to the Internet.

Figure 2C:
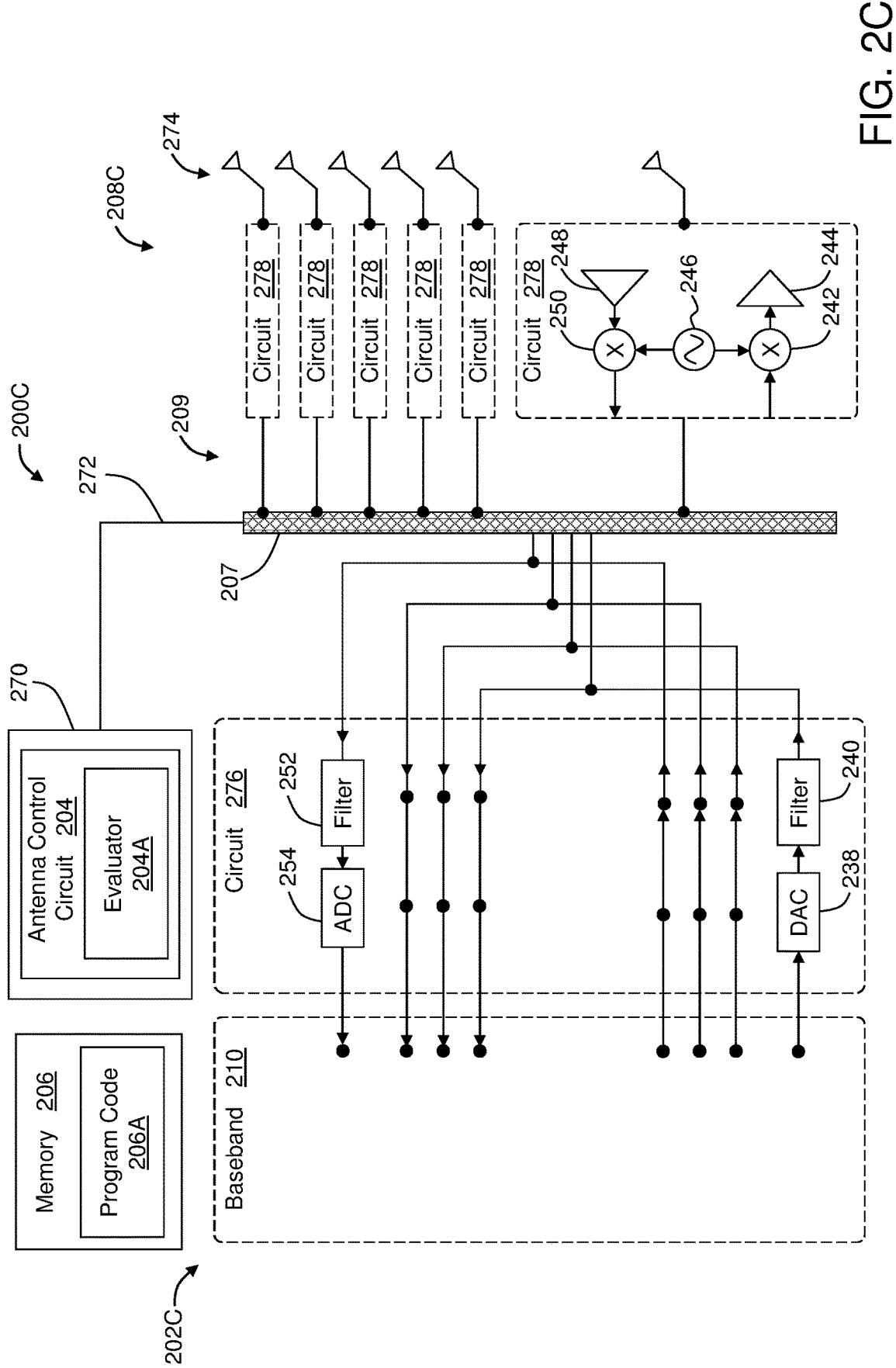
FIG. 2C is a block diagram of another example AP that may be implemented in the communication system of FIGS. 1A-1C.

FIG. 2C is a block diagram of another example AP 200C that may be implemented in the communication system 100 of FIGS. 1A-1C, arranged in accordance with at least one implementation described herein. The AP 200C may include, be included in, or correspond to the AP 102 of FIGS. 1A-1C. In general, the AP 200C may include a WiFi stage 202C, the antenna control circuit 204, and the non-volatile memory 206. The AP 200C may generally include the same or similar components and function in the same or similar manner with the same or similar connections as the AP 200A, except as otherwise noted herein.

For instance, the WiFi stage 202C of FIG. 2C includes the baseband circuit 210, similar to FIG. 2A. The baseband circuit 210 in FIG. 2C is shown without any of its components for simplicity. The baseband circuit 210 of FIG. 2C may include the same or similar components and may function in the same or similar manner as the baseband circuit 210 of FIG. 2A.

The WiFi stage 202C of FIG. 2C includes a circuit 276 that includes some of the components of the AFE RF circuit 212A of FIG. 2A. In particular, the circuit 276 of FIG. 2C includes DACs 238 and filters 240 on its transmit chains and filters 252 and ADCs 254 on its receive chains.

Further, some of the functionality of the AFE RF circuit 212A of FIG. 2A is provided in each of multiple distributed antenna circuits 208C (hereinafter "antenna circuits 208C") to which the AP 200C is coupled through the switch fabric 207 and the communication lines 209 in FIG. 2C. The antenna circuits 208C may include, be included in, or correspond to the antenna circuits 104 of FIGS. 1A-1C.

In the example of FIG. 2C, each of the antenna circuits 208B includes the antenna 274 and a circuit 278 coupled together. Various components that may be included in each of the circuits 278 are depicted in FIG. 2C for one of the circuits 278; the other circuits 278 may include the same or similar components. As illustrated, each of the circuits 278 includes one transmit chain and one receive chain. The transmit chain of each of the circuits 278 includes the RF upconverter 242 and the power amplifier 244, the RF upconverter 242 coupled to the VCO 246. The receive chain of each of the circuits 278 includes the LNA 248 and the downcoverter coupled to the VCO 246.

In operation, the baseband circuit 210 of FIG. 2C processes wireless communications in the same or similar manner as in FIG. 2A. In the case of outbound communications, for example, the WMAC circuit 214 performs initial processing of data to be transmitted as described with respect to FIG. 2A. As further described with respect to FIG. 2A, the data may then be framed by the framer 226, encoded and scrambled by the encoder and scrambler 228, demultiplexed by the demultiplexer 230, interleaved and mapped by the interleaver mappers 232, spatially mapped by the spatial mapper 234, and then converted from the frequency to the time domain by the IDFT circuits 236 to be output from the baseband circuit 210 as digital signals.

The digital signals are then provided to the circuit 276 where each is converted from a digital signal to an analog signal by the DAC 238 and then filtered by the filter 240. Each of the resulting filtered digital signals may be directed by and through the switch fabric 207 in accordance with the control signal 272 from the antenna control circuit 204 to a selectively coupled one of the antenna circuits 208C via a corresponding communication line 209.

Each of the selectively coupled antenna circuits 208C receives the filtered digital signal output from the corresponding transmit chin of the circuit 276 at its circuit 278. The circuit 278 upconverts the signal using the RF upconverter 242, and amplifies the signal using the power amplifier 244 as described with respect to FIG. 2A. The upconverted and amplified analog signal is then provided to the corresponding antenna 274, at which point the antenna 274 radiates a wireless signal from the analog signal.

Inbound communications are processed in much the same way as in FIG. 2A except that the RF functions are split between the circuit 276 of the AP 200C and the circuits 278 of the antenna circuits 208C. In particular, when a given antenna 274 receives a wireless signal, it generates an analog signal therefrom, the analog signal being passed to the corresponding circuit 278. The circuit 278 amplifies the signal using its LNA 248, downconverts the signal using its RF downconverter 250, and outputs the amplified and downconverted signal on the corresponding communication line 209. These signals may be directed from the selectively coupled antenna circuits 208C and corresponding communication lines 209 by and through the switch fabric 207 in accordance with the control signal 272 from the antenna control circuit 204 to a corresponding receive chain of the circuit 276.

In the circuit 276, each of the signals is filtered by the filter 252 and converted to a digital signal by the ADC 254. The digital signals are output to the baseband circuit 210.

In the baseband circuit 210 of FIG. 2C, the digital signals are converted from the time to the frequency domain by the DFT circuits 256, equalized by the equalizer 258, demapped and deinterleaved by the demappers 260 and deinterleavers 262, multiplexed by the multiplexer 264, decoded and descrambled by the decoder and descrambler 266, and de-framed in the deframer 268 as described with respect to FIG. 2A. As further described with respect to FIG. 2A, the received communication may then be passed to the WMAC circuit 214 where it is decrypted with the encryption and decryption circuit 218 and placed in the appropriate upstream hardware queue 216 for upload to the Internet.

Figure 3:
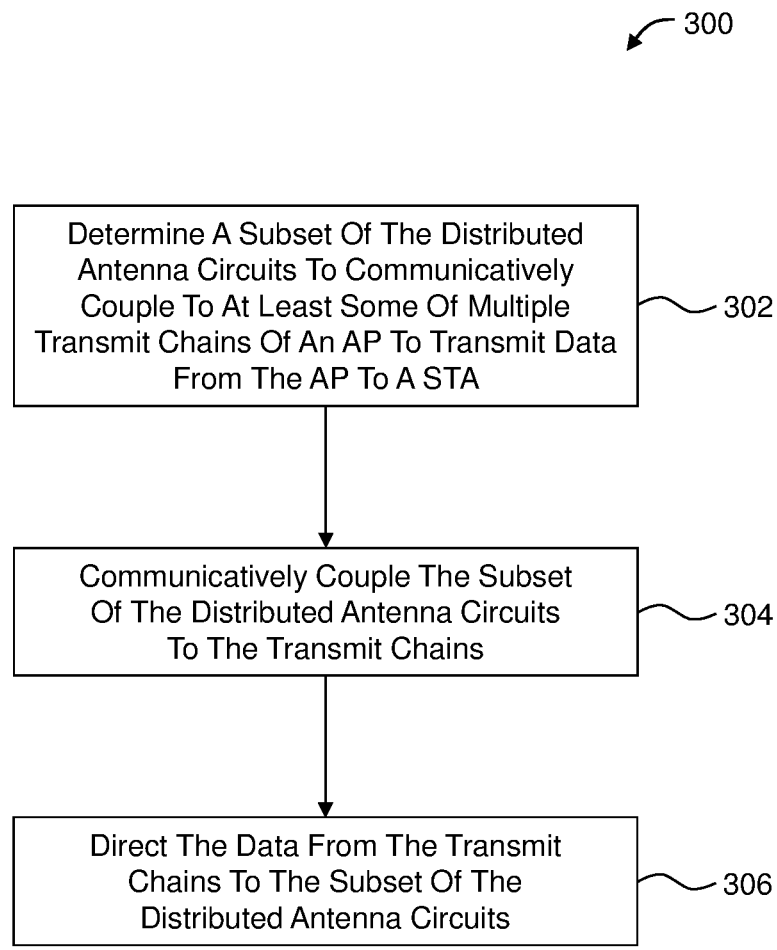
FIG. 3 illustrates a flowchart of an example method to communicate using multiple distributed antenna circuits in a communication system.

FIG. 3 illustrates a flowchart of an example method 300 to communicate using multiple distributed antenna circuits in a communication system, arranged in accordance with at least one implementation described herein. The method 300 may be performed by any suitable system, apparatus, or device. For example, any of the APs 102, 200A, 200B, 200C and/or the antenna circuits 104, 208A, 208B, 208C of FIGS. 1A-2C may perform or direct performance of one or more of the operations associated with the method 300. For purposes of discussion, the method 300 is discussed as being performed by the AP 102 of FIGS. 1A-1C where the AP 102 includes or corresponds to the AP 200A, 200B, or 200C of FIGS. 2A-2C and the antenna circuits 104 include or correspond to the antenna circuits 208A, 208B, or 208C. The method 300 may include one or more of blocks 302, 304, and/or 306.

At block 302, the method 300 includes determining a subset of the distributed antenna circuits to communicatively couple to at least some of multiple transmit chains of an AP to transmit data from the AP to a STA that is in range of the subset of the distributed antenna circuits. For example, block 302 may include the AP 102, and more particularly the antenna control circuit 204, determining antenna circuits 104, 104C to communicatively couple to corresponding transmit chains of the AP 102 to transmit data from the AP 102 to the STA 106A. The antenna control circuit 204 may make the determination at block 302 based on information collected and/or generated by the evaluator 204A, such as measured signal strength on one or more antennas, background noise on one or more antennas, observed throughput of a data transmission employing a given subset of the antennas, packet error rate on one or more antennas, or other metric as described elsewhere herein. Block 302 may be followed by block 304.

At block 304, the method 300 includes communicatively coupling the subset of the distributed antenna circuits to the transmit chains of the AP. For example, block 304 may include the antenna control circuit 204 providing the control signal 272 to the switch fabric 207 and/or the switch fabric 207 selectively communicatively coupling each of the antenna circuits 104B, 104C to a corresponding transmit chain of the AP 102. Block 304 may be followed by block 306.

At block 306, the method 300 includes directing the data from the at least some of the plurality of transmit chains to the subset of the plurality of distributed antenna circuits. For example, block 306 may include the switch fabric 207 directing the data from two of the transmit chains of the AP 102 to the antenna circuits 104B, 104C.

Directing the data from the at least some of the transmit chains to the subset of the distributed antenna circuits may include directing the data over one or more hardwired communication lines coupled between the AP and the distributed antenna circuits. The hardwired communication lines may include or correspond to the communication lines 108, 209 of FIGS. 1A-2C, which may include coaxial cable, telephone cable, category 5 cable, category 5e cable, category 6 cable, or optical fiber.

Alternatively or additionally, directing the data from the at least some of the transmit chains to the subset of the distributed antenna circuits may include directing an analog signal to the subset of the distributed antenna circuits where each of the distributed antenna circuits includes an antenna configured to radiate a wireless signal from the analog signal.

In some implementations, directing the data from the at least some of the transmit chains to the subset of the distributed antenna circuits includes directing a modulated digital signal to the subset of the distributed antenna circuits. Each of the distributed antenna circuits may include a DAC configured to convert the modulated digital signal to an analog signal and an antenna configured to radiate a wireless signal from the analog signal.

As described with respect to FIG. 1C, the data may be directed to the subset of the distributed antenna circuits at a first time. The method 300 may further include determining a second subset of the distributed antenna circuits, such as the antenna circuits 104E, 104F, 104A, to communicatively couple to one or more of the transmit chains of the AP to transmit second data from the AP to the STA that is in range of the second subset of the distributed antenna circuits at a second time that is subsequent to the first time. The method 300 may further include communicatively coupling the second subset of the distributed antenna circuits to the one or more of the transmit chains. The method 300 may further include directing the second data from the one or more of the transmit chains to the second subset of the distributed antenna circuits as described with respect to FIG. 1C.

One skilled in the art will appreciate that, for this and other processes and methods disclosed herein, the functions performed in the processes and methods may be implemented in differing order. Further, the outlined steps and operations are only provided as examples, and some of the steps and operations may be optional, combined into fewer steps and operations, or expanded into additional steps and operations without detracting from the essence of the disclosed implementations.

For example, the method 300 may further include transmitting the data from the subset of the distributed antenna circuits to the STA. In particular, the subset of the distributed antenna circuits may radiate wireless signals towards the STA based on the data received from the AP.

The method 300 may further include implementing BF using the distributed antenna circuits to transmit the data from the AP to the STA. For example, the AP 102 may implement BF on a downlink by controlling the phase and/or relative amplitude of the signal directed to each of two or more of the spatially distributed antenna circuits 104. In this manner, multiple instances of the signal radiate from the two or more antenna circuits 104 and constructively interfere at one or more locations (e.g., the location of an intended receiver STA 106) while destructively interfering at other locations. The AP 102 may alternatively or additionally implement BF on an uplink by a similar or analogous process.

The method 300 may further include implementing MU-MIMO transmission using the distributed antenna circuits to simultaneously transmit different data from the AP to two or more STAs. For example, with reference to FIG. 1B, the AP 102 may direct signals intended for the STA 106A to a first set of the antenna circuits 104, such as the antenna circuits 104B, 104C, and signals intended for the STA 106B to a second set of the antenna circuits 104, such as the antenna circuits 104D, 104E, 104F. Each set of antenna circuits 104 may then radiate the signals received from the AP 102 to the corresponding STA 106.

Implementing MU-MIMO transmission using the distributed antenna circuits to simultaneously transmit different data from the AP to two or more STAs may include: performing blocks 302, 304, and 306 for first data intended for a first STA; determining a second subset of the distributed antenna circuits to communicatively couple to one or more of the transmit chains of the AP to transmit second data from the AP to a second STA that is in range of the second subset of the distributed antenna circuits; communicatively coupling the second subset of the distributed antenna circuits to the one or more of the transmit chains; and directing the second data from the one or more of the transmit chains to the second subset of the distributed antenna circuits. In some implementations, the second subset of the distributed antenna circuits does not overlap with the subset of the distributed antenna circuits used to transmit the first data.

Figure 4:
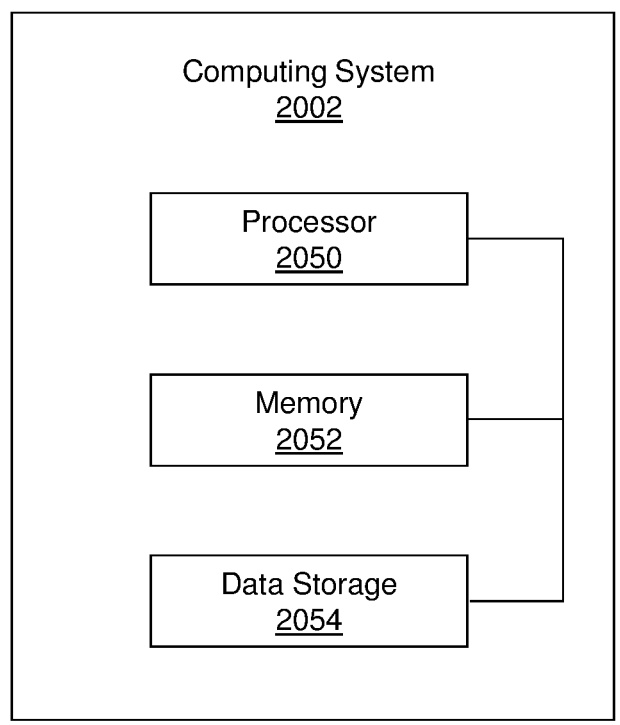
FIG. 4 illustrates a block diagram of an example computing system that may be used to perform or direct performance of one or more operations described according to at least one implementation of the present disclosure.

FIG. 4 illustrates a block diagram of an example computing system 2002 that may be used to perform or direct performance of one or more operations described according to at least one implementation of the present disclosure. The computing system 2002 may include a processor 2050, a memory 2052, and a data storage 2054. The processor 2050, the memory 2052, and the data storage 2054 may be communicatively coupled.

In general, the processor 2050 may include any suitable special-purpose or general-purpose computer, computing entity, or processing device including various computer hardware or software modules and may be configured to execute instructions stored on any applicable computer-readable storage media. For example, the processor 2050 may include a microprocessor, a microcontroller, a digital signal processor (DSP), an application-specific integrated circuit (ASIC), a Field-Programmable Gate Array (FPGA), or any other digital or analog circuitry configured to interpret and/or to execute computer-executable instructions and/or to process data. Although illustrated as a single processor, the processor 2050 may include any number of processors configured to, individually or collectively, perform or direct performance of any number of operations described in the present disclosure.

In some implementations, the processor 2050 may be configured to interpret and/or execute computer-executable instructions and/or process data stored in the memory 2052, the data storage 2054, or the memory 2052 and the data storage 2054. In some implementations, the processor 2050 may fetch computer-executable instructions from the data storage 2054 and load the computer-executable instructions in the memory 2052. After the computer-executable instructions are loaded into memory 2052, the processor 2050 may execute the computer-executable instructions.

The memory 2052 and the data storage 2054 may include computer-readable storage media for carrying or having computer-executable instructions or data structures stored thereon. Such computer-readable storage media may include any available media that may be accessed by a general-purpose or special-purpose computer, such as the processor 2050. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 2050 to perform a certain operation or group of operations.

Some portions of the detailed description refer to different modules configured to perform operations. One or more of the modules may include code and routines configured to enable a computing system to perform one or more of the operations described therewith. Additionally or alternatively, one or more of the modules may be implemented using hardware including any number of processors, microprocessors (e.g., to perform or control performance of one or more operations), DSPs, FPGAs, ASICs or any suitable combination of two or more thereof. Alternatively or additionally, one or more of the modules may be implemented using a combination of hardware and software. In the present disclosure, operations described as being performed by a particular module may include operations that the particular module may direct a corresponding system (e.g., a corresponding computing system) to perform. Further, the delineating between the different modules is to facilitate explanation of concepts described in the present disclosure and is not limiting. Further, one or more of the modules may be configured to perform more, fewer, and/or different operations than those described such that the modules may be combined or delineated differently than as described.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of configured operations leading to a desired end state or result. In example implementations, the operations carried out require physical manipulations of tangible quantities for achieving a tangible result.

Unless specifically stated otherwise, as apparent from the discussion, it is appreciated that throughout the description, discussions utilizing terms such as detecting, determining, analyzing, identifying, scanning or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. Computer-executable instructions may include, for example, instructions and data which cause a general-purpose computer, special-purpose computer, or special-purpose processing device (e.g., one or more processors) to perform or control performance of a certain function or group of functions.

Although the subject matter has been described in language specific to structural features and/or methodological acts, it is to be understood that the subject matter configured in the appended claims is not necessarily limited to the specific features or acts described above. Rather, the specific features and acts described above are disclosed as example forms of implementing the claims.

An example apparatus can include a Wireless Access Point (WAP) or a station and incorporating a VLSI processor and program code to support. An example transceiver couples via an integral modem to one of a cable, fiber or digital subscriber backbone connection to the Internet to support wireless communications, e.g. IEEE 802.11 compliant communications, on a Wireless Local Area Network (WLAN). The WiFi stage includes a baseband stage, and the analog front end (AFE) and RF stages. In the baseband portion wireless communications transmitted to or received from each user/client/station are processed. The AFE RF portion handles the upconversion on each of transmit paths of wireless transmissions initiated in the baseband. The RF portion also handles the downconversion of the signals received on the receive paths and passes them for further processing to the baseband.

An example apparatus can be a multiple-input multiple-output (MIMO) apparatus supporting as many as N×N discrete communication streams over N antennas. In an example the MIMO apparatus signal processing units can be implemented as N×N. In various implementations, the value of N can be 4, 6, 8, 12, 16, etc. Extended MIMO operation enables the use of up to 2N antennae in communication with another similarly equipped wireless system. It should be noted that extended MIMO systems can communicate with other wireless systems even if the systems do not have the same number of antennae, but some of the antennae of one of the stations might not be utilized, reducing optimal performance.

Channel State Information (CSI) from any of the devices described herein can be extracted independent of changes related to channel state parameters and used for spatial diagnosis services of the network such as motion detection, proximity detection, and localization which can be utilized in, for example, WLAN diagnosis, home security, health care monitoring, smart home utility control, elder care, automotive tracking and monitoring, home or mobile entertainment, automotive infotainment, and the like.

Unless specific arrangements described herein are mutually exclusive with one another, the various implementations described herein can be combined in whole or in part to enhance system functionality and/or to produce complementary functions. Likewise, aspects of the implementations may be implemented in standalone arrangements. Thus, the above description has been given by way of example only and modification in detail may be made within the scope of the present invention.

With respect to the use of substantially any plural or singular terms herein, those having skill in the art can translate from the plural to the singular or from the singular to the plural as is appropriate to the context or application. The various singular/plural permutations may be expressly set forth herein for sake of clarity. A reference to an element in the singular is not intended to mean "one and only one" unless specifically stated, but rather "one or more." Moreover, nothing disclosed herein is intended to be dedicated to the public regardless of whether such disclosure is explicitly recited in the above description.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that include A alone, B alone, C alone, A and B together, A and C together, B and C together, or A, B, and C together, etc.). Also, a phrase presenting two or more alternative terms, whether in the description, claims, or drawings, should be understood to include one of the terms, either of the terms, or both terms. For example, the phrase "A or B" will be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements.

The present invention may be embodied in other specific forms without departing from its spirit or essential characteristics. The described implementations are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A communication system, comprising:
   a plurality of distributed antenna circuits, including at least a first antenna circuit and a second antenna circuit; and
   an access point (AP) coupled to the plurality of distributed antenna circuits, the AP including:
      a plurality of transmit chains;
      a plurality of receive chains; and
      an antenna control circuit communicatively coupled to the plurality of transmit chains and the plurality of receive chains,
      wherein:
         the first antenna circuit is co-located with the AP and the second antenna circuit is remote from the AP; and
         the antenna control circuit is configured to determine a subset of the plurality of distributed antenna circuits to communicatively couple to at least some of the plurality of transmit chains to transmit data to a wireless station (STA) that is in range of the subset of the plurality of distributed antenna circuits.

2. The communication system of claim 1, wherein the first antenna circuit and the AP are located in or a near a first room of a premises and the second antenna circuit is located in or a near a different second room of the premises.

3. The communication system of claim 2, wherein:
   the plurality of distributed antenna circuits further includes a third antenna circuit;
   the third antenna circuit is located in a different location of the premises than the first antenna circuit or the second antenna circuit.

4. The communication system of claim 1, wherein the second antenna circuit comprises an antenna in a different room or location of a premises than the AP, the antenna configured to radiate a wireless signal from an analog signal received from the AP.

5. The communication system of claim 1, wherein the second antenna circuit comprises:
   a power amplifier remote from the AP and configured to amplify an analog signal received from the AP; and
   an antenna co-located with and coupled to the power amplifier, the antenna configured to radiate a wireless signal from the amplified analog signal.

6. The communication system of claim 1, wherein the second antenna circuit comprises:
   a radio frequency (RF) upconverter remote from the AP and configured to upconvert an analog signal received from the AP;
   a power amplifier co-located with and coupled to the RF upconverter, the power amplifier configured to amplify the analog signal upconverted by the RF upconverter; and
   an antenna co-located with the RF upconverter and the power amplifier, the antenna coupled to the power amplifier and configured to radiate a wireless signal from the amplified analog signal.

7. The communication system of claim 1, wherein the second antenna circuit comprises:
   an analog front end (AFE) radio frequency (RF) circuit remote from the AP and configured to convert a digital signal received from the AP to an analog signal and filter, upconvert, and amplify the analog signal; and
   an antenna co-located with and coupled to the AFE RF circuit, the antenna configured to radiate a wireless signal from the analog signal.

8. The communication system of claim 1, wherein the second antenna circuit comprises a radiohead.

9. The communication system of claim 1, further comprising one or more hardwired communication lines communicatively coupling the AP to the second antenna circuit, the one or more hardwired communication lines comprising at least one of: coaxial cable, telephone cable, category 5 cable, category 5e cable, category 6 cable, or optical fiber.

10. The communication system of claim 1, wherein a number of the plurality of distributed antenna circuits is greater than a number of the plurality of transmit chains.

11. The communication system of claim 1, wherein the antenna control circuit is further configured to implement at least one of:
   beamforming using the plurality of distributed antenna circuits to transmit the data from the AP to the STA; or
   multi-user (MU)-multiple input multiple output (MIMO) transmission using the plurality of distributed antenna circuits to simultaneously transmit different data from the AP to two or more STAs.

12. A method to communicate using a plurality of distributed antenna circuits in a communication system, the method comprising:
   determining a subset of the plurality of distributed antenna circuits to communicatively couple to at least some of a plurality of transmit chains of an access point (AP) to transmit data from the AP to a wireless station (STA) that is in range of the subset of the plurality of distributed antenna circuits, wherein determining the subset of the plurality of distributed antenna circuits comprises determining that the STA is in range of a given antenna circuit of the subset, the given antenna circuit being remote from the AP;

communicatively coupling the subset of the plurality of distributed antenna circuits, including the given antenna circuit, to the at least some of the plurality of transmit chains; and directing the data from the at least some of the plurality of transmit chains to the subset of the plurality of distributed antenna circuits, including the given antenna circuit.

13. The method of claim 12, further comprising the given antenna circuit radiating a wireless signal representing data received from the AP without performing any WiFi processing on the data received from the AP before radiating the wireless signal.

14. The method of claim 13, further comprising transmitting the data from the subset of the plurality of distributed antenna circuits to the STA.

15. The method of claim 12, wherein directing the data from the at least some of the plurality of transmit chains to the subset of the plurality of distributed antenna circuits, including the given antenna circuit, comprises directing at least some of the data from the AP in a first room or location of a premises to the given antenna circuit in a different second room or location of the premises.

16. The method of claim 12, wherein directing the data from the at least some of the plurality of transmit chains to the subset of the plurality of distributed antenna circuits comprises directing the data over one or more hardwired communication lines coupled between the AP and the plurality of distributed antenna circuits.

17. The method of claim 12, wherein directing the data from the at least some of the plurality of transmit chains to the subset of the plurality of distributed antenna circuits comprises directing an analog signal to the subset of the plurality of distributed antenna circuits, each of the plurality of distributed antenna circuits comprising an antenna configured to radiate a wireless signal from the analog signal.

18. The method of claim 12, wherein directing the data from the at least some of the plurality of transmit chains to the subset of the plurality of distributed antenna circuits comprises directing a modulated digital signal to the subset of the plurality of distributed antenna circuits, each of the plurality of distributed antenna circuits comprising a digital to analog converter (DAC) configured to convert the modulated digital signal to an analog signal and an antenna configured to radiate a wireless signal from the analog signal.

19. The method of claim 12, wherein the data is directed to the subset of the plurality of distributed antenna circuits at a first time, the method further comprising:

determining a second subset of the plurality of distributed antenna circuits to communicatively couple to one or more of the plurality of transmit chains of the AP to transmit second data from the AP to the STA that is in range of the second subset of the plurality of distributed antenna circuits at a second time that is subsequent to the first time;

communicatively coupling the second subset of the plurality of distributed antenna circuits to the one or more of the plurality of transmit chains; and directing the second data from the one or more of the plurality of transmit chains to the second subset of the plurality of distributed antenna circuits.

20. The method of claim 12, further comprising implementing at least one of:

beamforming using the plurality of distributed antenna circuits to transmit the data from the AP to the STA; or multi-user (MU)-multiple input multiple output (MIMO) transmission using the plurality of distributed antenna circuits to simultaneously transmit different data from the AP to two or more STAs.

\* \* \* \* \*